United States Patent
Luke et al.

(12) 
(10) Patent No.: US 11,927,905 B2
(45) Date of Patent: Mar. 12, 2024

(54) TOKEN PERMITTING PRINT MATERIAL CARTRIDGE USAGE

(71) Applicant: Hewlett-Packard Development Company, L.P., Spring, TX (US)

(72) Inventors: Jeffrey H. Luke, Boise, ID (US); Gabriel S. McDaniel, Boise, ID (US); Scott K Hymas, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/910,055

(22) PCT Filed: May 26, 2020

(86) PCT No.: PCT/US2020/034512
§ 371 (c)(1),
(2) Date: Sep. 8, 2022

(87) PCT Pub. No.: WO2021/242218
PCT Pub. Date: Dec. 2, 2021

(65) Prior Publication Data
US 2023/0125716 A1    Apr. 27, 2023

(51) Int. Cl.
*G03G 15/08* (2006.01)
*G03G 15/00* (2006.01)

(52) U.S. Cl.
CPC ....... *G03G 15/556* (2013.01); *G03G 15/5079* (2013.01)

(58) Field of Classification Search
CPC .......................... G03G 15/5079; G03G 15/556

USPC .......................................... 399/8, 24, 25, 27
See application file for complete search history.

(56) References Cited

U.S. PATENT DOCUMENTS

| | | | |
|---|---|---|---|
| 8,660,442 B2 | 2/2014 | Spink et al. | |
| 8,995,852 B2 * | 3/2015 | Suzuki | G03G 15/0856 399/119 |
| 9,400,468 B2 | 7/2016 | Wood | |
| 9,465,343 B2 | 10/2016 | Kamasuka | |
| 9,753,424 B2 | 9/2017 | Kawana | |
| 10,671,002 B2 * | 6/2020 | Yabuki | G03G 15/50 |
| 2017/0320327 A1 | 11/2017 | Sun et al. | |
| 2018/0240179 A1 * | 8/2018 | Yamamoto | B41J 2/17509 |
| 2019/0346801 A1 | 11/2019 | Miyazawa | |

FOREIGN PATENT DOCUMENTS

| | | |
|---|---|---|
| CN | 105856848 A | 8/2016 |
| JP | 2001-199081 A | 7/2001 |
| JP | 2019-197411 A | 11/2019 |
| WO | 2019/152033 A1 | 8/2019 |

* cited by examiner

*Primary Examiner* — Hoan H Tran
(74) *Attorney, Agent, or Firm* — Brooks, Cameron & Huebsch, PLLC

(57) ABSTRACT

In response to detecting that a remaining supply of print material of a first cartridge has reached a first threshold, a printing device transmits a request. In response to detecting that a second cartridge has replaced the first cartridge, the printing device determines whether the remaining supply had reached a second threshold and whether a token permitting usage of the second cartridge was received responsive to the request. In response to determining that the remaining supply had reached the second threshold and that the token was received, the printing device prints with print material from the second cartridge.

15 Claims, 6 Drawing Sheets

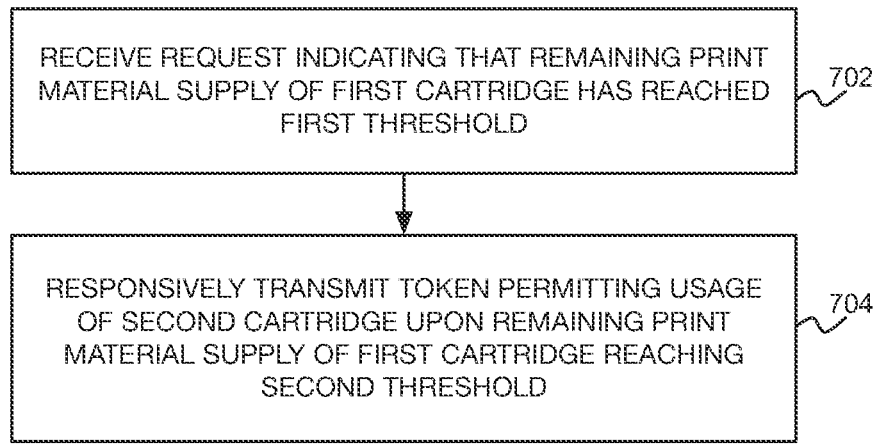
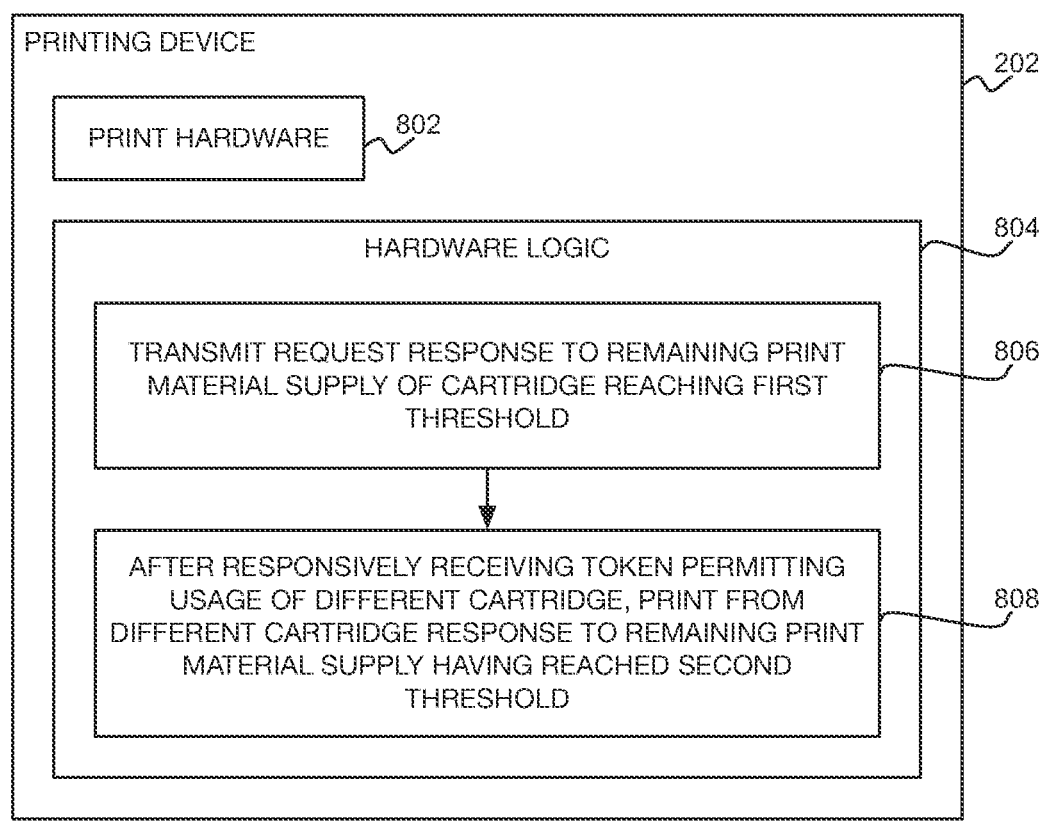

TOKEN PERMITTING PRINT MATERIAL CARTRIDGE USAGE

BACKGROUND

Printing devices can use a variety of different technologies to form images on media such as paper or to build three-dimensional (3D) objects. Such technologies include dry electrophotography (EP) and liquid EP (LEP) technologies, which may be considered as different types of laser and light-emitting diode (LED) printing technologies, as well as inkjet-printing technologies and three-dimensional (3D) printing technologies. Printing devices deposit print material, such as colorant like toner, ink (which can include other printing fluids or material as well), or 3D print material.

BRIEF DESCRIPTION OF THE DRAWINGS

FIG. 7 is a flowchart of an example method.

FIG. 8 is a block diagram of an example printing device.

DETAILED DESCRIPTION

Figure 1:
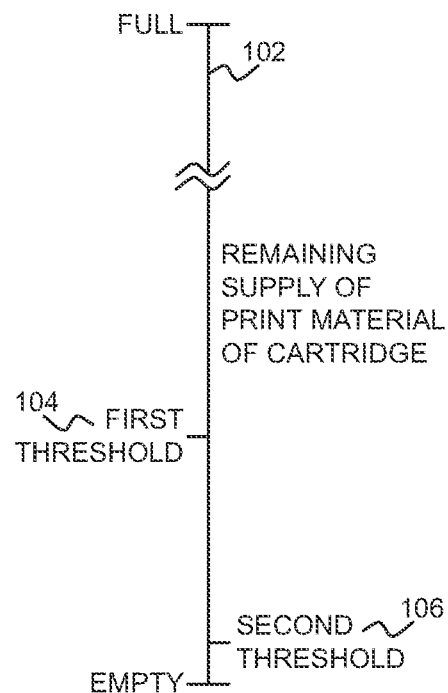
FIG. 1 is a diagram of example remaining print material supply thresholds for a currently installed print material cartridge of a printing device.

As noted in the background, printing devices deposit print material to form images on media or, in the case of three-dimensional (3D) printing devices, to additively build (3D) objects. A printing device may thus include a cartridge having a supply of print material, like toner, ink, other colorant, 3D print material, and so on. When the print material supply is depleted, the cartridge can be replaced with a replacement cartridge having a fresh supply of print material. A printing device may provide a notification when the remaining print material supply of the currently installed cartridge is running low and/or has become depleted.

A currently installed cartridge of the printing device may be prematurely replaced, however, wasting the remaining print material supply in the cartridge at time of replacement. A provided notification that the remaining print material supply is running low, for example, may mistakenly be interpreted as the cartridge having to be replaced, even though the cartridge still has an ample supply of print material remaining. For example, the cartridge may be replaced as soon as a replacement cartridge becomes available, instead of when its supply of print material has become depleted.

Techniques described herein ameliorate these and other issues. In response to detecting that a remaining supply of print material of a first cartridge has reached a first threshold, a printing device can transmit a request to a computing device. The printing device may subsequently detect that the first cartridge has been replaced with a second cartridge. However, the printing device does not print with print material from the second cartridge unless the remaining print material supply of the first cartridge had reached a lower, second threshold, and a token permitting usage of the second cartridge was received from the computing device responsive to the request.

The techniques described herein can therefore reduce if not eliminate premature cartridge replacement, and thus reduce the print material wastage that results from such premature replacement. The printing device cannot use a replacement cartridge until the remaining print material supply of the currently installed cartridge has dropped below the second threshold. Furthermore, even when the remaining print material supply has dropped below the second threshold, the printing device still cannot use the replacement cartridge unless a token permitting its use has also been received.

The usage of such a token in addition to a second threshold in controlling when the replacement cartridge may be employed within the printing device can reduce print material wastage as compared to usage of just the second threshold. As one example, the computing device may transmit an updated second (e.g., even lower) threshold along with (i.e., in addition to) the token in response to the request from the printing device. If the printing device receives neither, then the printing device will not be able to use the replacement cartridge. In this case, the token in effect ensures that printing device will use the updated, lower second threshold, and not the original, higher second threshold, to control usage of the replacement cartridge.

As another example, the computing device may transmit an updated first (e.g., even lower) threshold instead of the token in response to the request from the printing device. The printing device then transmits an additional request when the remaining print material supply of its currently installed cartridge has reached the updated first threshold, at which time the computing device may provide the token as well as arrange for receipt of the replacement cartridge at the printing device. In this case, the token operatively reduces print material wastage, by ensuring that the replacement cartridge is not received too early and its print material effectively wasted until the cartridge is installed.

FIG. 1 illustratively shows an example remaining print material supply 102 of a print material cartridge that can be installed within a printing device. At time of installation within the printing device, the print material supply 102 may be full, or otherwise at a maximum amount of print material. As the printing device prints using the supply 102 of print material from the cartridge, the remaining print material supply 102 decreases. At some point the remaining supply 102 may reach a first threshold 104. As the print material supply 102 continues to be used for printing, the supply 102 drops further until it reaches a second threshold 106 less than the first threshold. At some point the remaining supply 102 may become fully depleted, and thus empty.

Either or both thresholds 104 and 106 may be dynamic or adjustable and thus periodically updated. In one implementation, the thresholds 104 and 106 are independent of one another apart from the constraint that the second threshold 106 is less than the first threshold 104. That is, the value of the first threshold 104 does not depend on the value of the second threshold 106, and vice-versa. For example, this means that the first threshold 104 can be updated without having to update the second threshold 106, and regardless of whether the second threshold 106 is even adjustable. Similarly, this means that the second threshold 106 can be updated without having to update the first threshold 104, and regardless of whether the first threshold 104 is even adjustable.

In another implementation, the thresholds 104 and 106 may be related to one another, such that explicitly updating either threshold 104 or 106 correspondingly results in updating the other threshold 106 or 104. As one example, the first threshold 104 may be specified as a certain percentage or absolute amount above the second threshold 106. In this case, if the second threshold 106 is explicitly updated to a new value results, then the first threshold 104 is also correspondingly updated to a new value as well even though its new value has not been explicitly specified.

Figure 2:
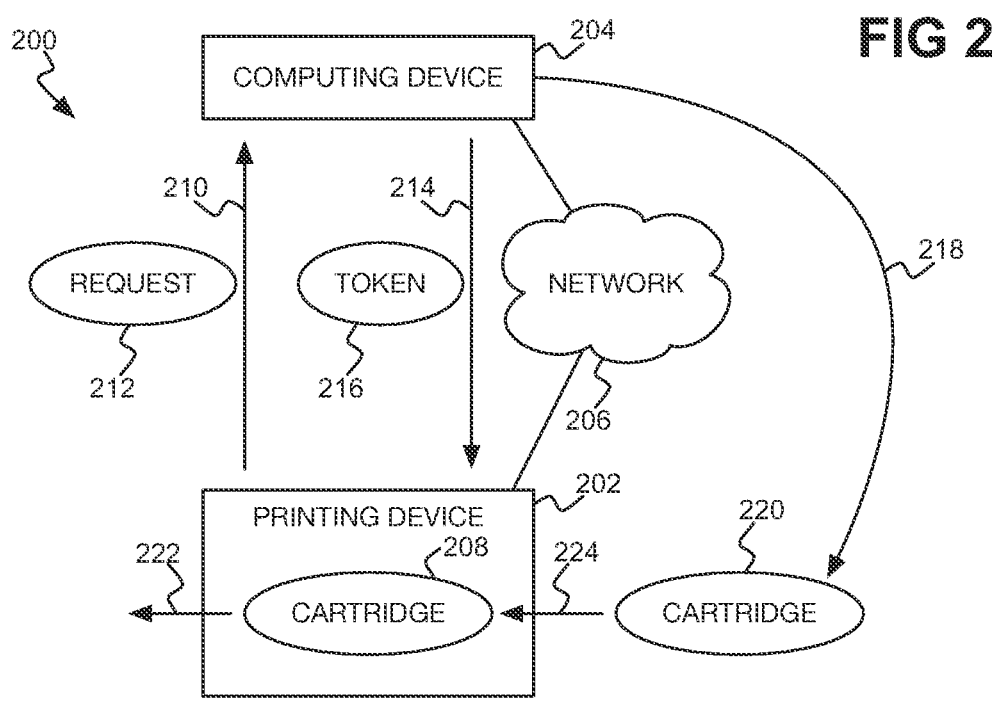
FIG. 2 is a diagram of an example system for controlling usage of a replacement print material cartridge within a printing device.

FIG. 2 shows an example system 200. The system 200 includes a printing device 202 and a computing device 204. The printing device 202 may be a standalone printer or an all-in-one (AIO) device that combines printing functionality with other functionality, such as scanning functionality. The computing device 204 may be a server or another type of computing device. The printing device 202 and the computing device 104 are communicatively connected to a network 206, such as wired or wireless networks, intranets, extranets, the Internet, and so on.

The printing device 202 has a currently installed print material cartridge 208, which may be referred to as a first cartridge. The print material cartridge 208 contains a supply of print material that the printing device 202 uses to print. As the printing device 202 uses the print material from the cartridge 208, the device 202 can track the supply of print material supply remaining within the cartridge 208. At some point the remaining print material supply reaches a first threshold, such as the first threshold 104 of FIG. 1.

Upon detecting that the print material supply within the cartridge 208 has reached the first threshold, the printing device 202 per arrow 210 transmits a request 212 to the computing device 204 via the network 206. Upon receiving the request, the computing device 204 may per arrow 218 responsively initiate receipt of a replacement cartridge 220 at the printing device 202. The replacement cartridge 220 may also be referred to as a second cartridge. As one example, the computing device 204 may initiate shipment of the cartridge 220 to a location at which the printing device 202 is installed.

The computing device 204 may also per arrow 214 transmit a token 216 to the printing device 202 via the network 206 in response to receiving the request 212. The token 216 permits usage of the cartridge 220 within the printing device 202; that is, the token 216 permits the device 202 to use the supply of print material within the cartridge 220 for printing. The printing device 202 thus receives the token 216 from the computing device 204 upon the computing device 204 having initiated receipt of the replacement cartridge 220 at the printing device. At some point upon receipt of the cartridge 220 at the location of the printing device 202, the cartridge 208 is removed from the device 202 per the arrow 222 and the cartridge 220 installed within the printing device 202 in its place per arrow 224.

Upon detecting replacement of the cartridge 208 with the cartridge 220, the printing device 202 will not, however, use the print material supply of the cartridge 220 unless two conditions have been satisfied. First, the printing device 202 has to have received the token 216 that permits the device 202 to use the cartridge 220. Second, the remaining print material supply within the replaced cartridge 208 had to have reached a lower, second threshold, such as the second threshold 106 of FIG. 1.

If upon installation of the cartridge 220 the printing device 202 has received the token 216 but the remaining print material supply of the cartridge 208 had not reached the second threshold, then printing with the print material supply from the cartridge 220 is prohibited. Likewise, if upon installation of the cartridge 220 the remaining print material supply of the cartridge 208 had reached the second threshold but the printing device 202 has not received the token 216, then the cartridge 220 will not be used for printing. In either case, print material wastage is reduced.

Figure 3:
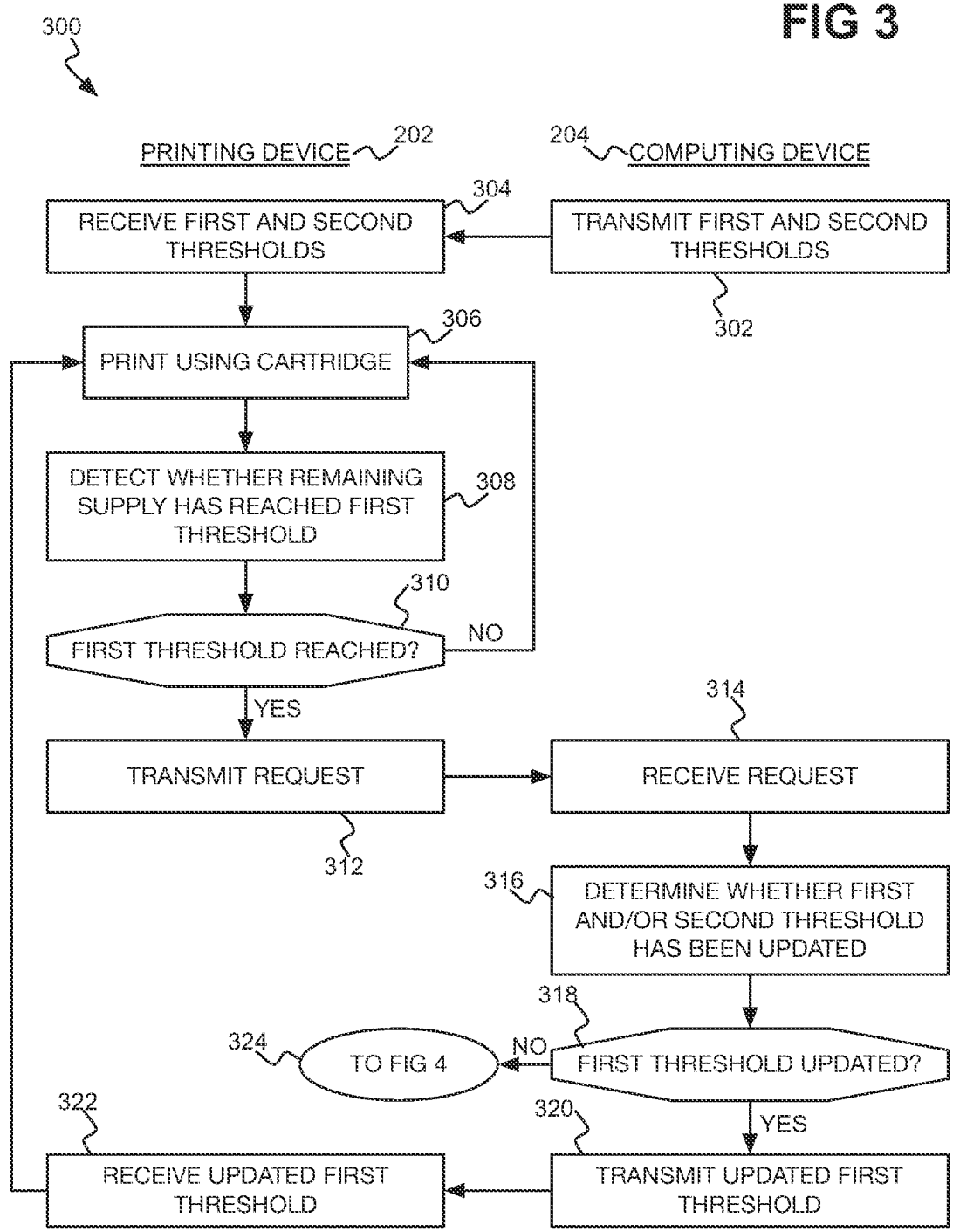
FIGS. 3, 4, and 5 are flowcharts of example methods for controlling usage of a replacement print material cartridge within a printing device.

FIG. 3 shows an example method 300. The parts of the method 300 in the left column can be performed by the printing device 202. The parts of the method 300 in the right column can be performed by the computing device 204. The method 300 may be implemented as program code stored on a non-transitory computer-readable data storage medium and executable by a processor, such as that of the printing device 202 or the computing device 204. The method 300 may start with the cartridge 208 having been installed within the printing device 202.

The computing device 204 may transmit first and second thresholds to the printing device 202 (302), which receives the thresholds (304). The thresholds may be transmitted at time of installation of the cartridge 208, when the printing device 202 detects installation of the cartridge 208 and thus may accordingly notify the device 204. In another implementation, the thresholds may be transmitted in that default such thresholds may be programmed into the cartridge 208 and read by the printing device 202 at installation of the cartridge 208 in the device 202.

The printing device 202 prints using the cartridge 208 (306). More specifically, the printing device 202 prints using the print material supply contained within the cartridge 208. As the printing device 202 prints using the cartridge 208, the print material supply remaining within the cartridge 208 becomes depleted. The printing device 202 indirectly or directly tracks the print material supply remaining within the cartridge 208 as it becomes depleted.

The printing device 202 can thus detect whether the remaining print material supply of the cartridge 208 has reached the first threshold (308). If the first threshold has not been reached (310), then the printing device 202 can continue to print using the cartridge 208 (306). Once the first threshold has been reached, the printing device 202 transmits a request to the computing device 204 (312). The computing device 204 responsively receives the request (314).

The request may be for a replacement cartridge, such as the cartridge 220, to be provided so that the cartridge is on hand to replace the cartridge 208 when the cartridge 208 becomes depleted. The request may in addition or instead be for a token permitting a replacement cartridge to be used in the printing device 202 in lieu of the cartridge 208. The request may in addition or instead be considered a notification informing the computing device 204 that the print material supply remaining within the cartridge 208 has reached the first threshold.

Upon receiving the request, the computing device 204 determines whether the first threshold, the second threshold, or both the first and second thresholds have been updated since they were transmitted to the printing device 202 (316). That is, the computing device 204 determines whether the first threshold has been supplanted by an updated first threshold, and/or whether the second threshold has been supplanted by an updated second threshold. The first threshold may be decreased, whereas the second threshold may be increased or decreased. For example, the first threshold may be decreased if the length of time for the replacement cartridge 220 to reach the location of the printing device 202 is expected to be shorter than previously predicted, and therefore the cartridge 220 does not yet have to be sent.

As another example, the second threshold may be increased if available information indicates that the margin of error in tracking the remaining print material supply of the cartridge 208 is higher than previously expected. Therefore, the second threshold can be increased to ensure that the cartridge 220 has arrived when the print material supply of the cartridge 208 has been depleted. Similarly, the second threshold may be decreased if available information indicates that the margin of error in tracking the remaining print material supply of the cartridge 208 is lower than previously expected.

If the first threshold in particular has been updated (318), then the computing device 204 transmits the updated first threshold to the printing device 202 (320). The updated first threshold can be transmitted to the printing device 202 in lieu of transmitting a token permitting usage of the cartridge 220 in place of the cartridge 208 within the device 220. The updated first threshold may be transmitted to the printing device 202 in lieu of initiating shipment of the cartridge 220 to the location of the printing device 202. (It is also noted that the first threshold may be periodically updated and transmitted to the printing device 202 asynchronously, such as even prior to the printing device 202 transmitting the request in part 312 and the computing device 204 correspondingly receiving the request in part 314.)

The printing device 202 receives the updated first threshold (322). The printing device 202 then continues to print using the currently installed cartridge 208 (306) (i.e., as print jobs are received). The printing device 202 detects whether the print material supply remaining within the cartridge has reached the first threshold as has been updated (308), Once the remaining print material supply has reached the updated first threshold (310), the printing device 202 again sends a request (312), which in this case is the second such request sent to the computing device 204.

This iterative process is repeated until the computing device 204 has determined, after receiving the request most recently transmitted by the printing device 202 (314), that the first threshold in particular has not been updated (316). More specifically, this process is repeated until the computing device 204 has determined that the first threshold has not been updated to a lower value, since the remaining print material supply of the cartridge 208 will have already reached any higher value. At this time (318), the method 300 proceeds to FIG. 4 (324).

Figure 4:
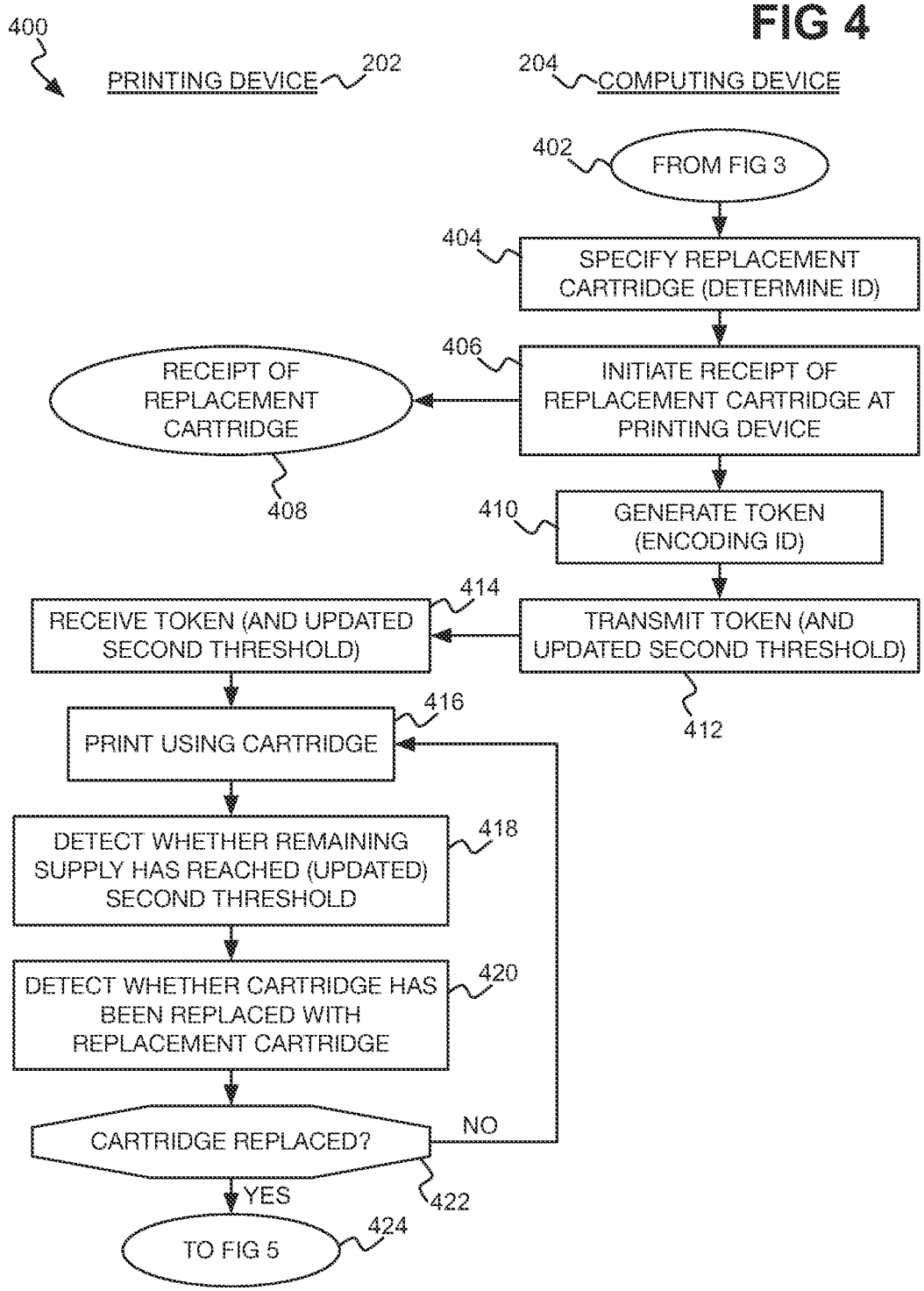

FIG. 4 shows an example method 400. The parts of the method 400 in the left column can be performed by the printing device 202. The parts of the method 400 in the right column can be performed by the computing device 204. As with the method 300 of FIG. 3, the method 400 may be implemented as program code stored on a non-transitory computer-readable data storage medium and executable by a processor, such as that of the printing device 202 or the computing device 204. The method 400 is performed as preceded by FIG. 3 (402).

The computing device 204 can specify the replacement cartridge 220 (404), including an identifier of the cartridge 220 like the serial number of the cartridge 220. For example, the printing device 202 may be compatible with a given type of print material cartridge. The actual cartridge that will replace the currently installed cartridge 208 may not be or specified until part 404 is performed. As such, part 404 can include selecting (i.e., allocating or reserving) the specific cartridge 220 that is to replace the currently installed cartridge 208.

The computing device 204 may then initiate receipt of the replacement cartridge 220 at the printing device 202 (406). For example, the computing device 204 may arrange or otherwise initiate shipment of the replacement cartridge 220 to the location of the printing device 202. Once such shipment has been initiated, at some point thereafter the cartridge 220 is received at the location of the printing device 202 (408). As one example, the cartridge 220 may be received by an administrator at a different location, who then brings the cartridge 220 to where the printing device 202 is located.

The computing device 204 also generates a token permitting usage of the replacement cartridge 220 within the printing device 202 (410). The token may be specific to the cartridge 220, specifically permitting usage of the cartridge 220 within the printing device 202, and not any other cartridge, in replacement of the cartridge 208. In another implementation, the token may instead not be specific to the cartridge 208, permitting the cartridge 208 to be replaced by any cartridge, and in this respect may generally pertain to the cartridge 208.

The computing device 204 can encode the identifier of the cartridge 220, such as its serial number, within the token, as part of generating the token. As one example, the computing device 204 may digitally sign the identifier with its private cryptographic key to generate the token; the printing device 202 can thus authenticate the token using the corresponding public cryptographic key of the computing device 204. As another example, the computing device 204 may encrypt the identifier with a public key of the printing device 202 to generate the token, in which case just the printing device 202, which confidentially possesses the corresponding private key, can decrypt the identifier.

The computing device 204 transmits the token to the printing device 202 (412), which responsively receives the token (414). If the computing device 204 had determined in part 316 of FIG. 3 that the second threshold was updated, the computing device 204 also transmits and the printing device 202 also receives the second threshold as so updated. (If there is a communication error and multiple tokens are sent and/or received, the most recent token is used and any others disregarded. It is also noted that the second threshold may be periodically updated and transmitted to the printing device 202 asynchronously, such as even prior to the printing device 202 transmitting the request in part 312 of FIG. 3 and the computing device 204 correspondingly receiving the request in part 314 of FIG. 3.) The printing device 202 continues to print using the currently installed cartridge 208 (416) while tracking the print material supply remaining within the cartridge 208, as in part 306 of FIG. 3.

In FIG. 4, however, the printing device 202 detects whether the remaining print material supply of the cartridge 208 has reached the second threshold (418). The second threshold in this respect is the updated second threshold if the printing device 202 has received an updated second threshold from the computing device 204. The printing device 202 also detects whether the cartridge 208 has been replaced by a different cartridge (420), such as the replacement cartridge 220. Until the cartridge 208 is replaced (422), the printing device 202 continues to print using the cartridge 208 (416).

At the time of replacement of the cartridge 208, its remaining print material supply remaining may have reached the second threshold, or may have not. If the cartridge 208 was replaced prior to its remaining supply reaching the second threshold, then such replacement is premature, and if the cartridge 208 was replaced after its remaining supply reached the second threshold, then replacement is not premature. In either case, once the printing device 202 detects replacement of the cartridge 208 (422), the method 400 proceeds to FIG. 5 (424).

Figure 5:
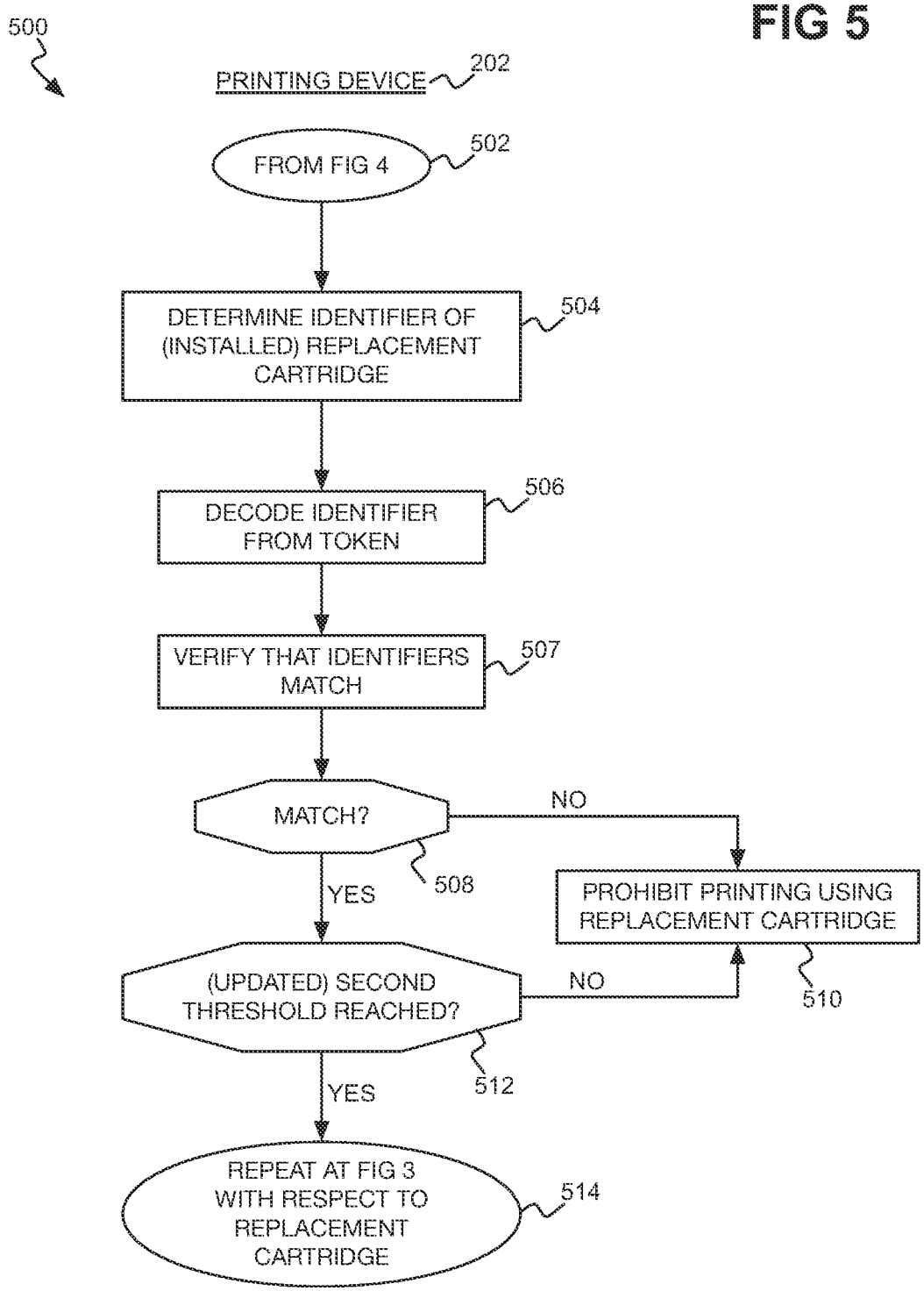

FIG. 5 shows an example method 500. The method 500 can be performed by the printing device 202. As with the methods 300 and 400 of FIGS. 3 and 4, the method 500 may be implemented as program code stored on a non-transitory computer-readable data storage medium and executable by a processor, such as that of the printing device 202. The method 500 is performed as preceded by FIG. 4 (502), such that the cartridge 208 has been replaced within the printing device 202 by a different cartridge, which may be the cartridge 220 previously received at the location of the device 202.

The printing device 202 determines the identifier of the newly installed cartridge (504). For example, the serial number or other identifier may be stored within non-volatile memory of the cartridge, and thus readable by the printing device 202. The printing device 202 further decodes the identifier of the cartridge 220 that has been encoded within the received token (506), and verifies whether the identifier of the newly installed cartridge matches the identifier encoded within the token (508). The printing device 202 can thus verify whether the newly installed cartridge is the cartridge 220.

If the newly installed cartridge's identifier does not match the token's identifier (508), then the newly installed cartridge is not the cartridge 220. Therefore, printing using the newly installed replacement cartridge is prohibited (510). Stated another way, the printing device 202 does not print using the print material supply of the replacement cartridge, because a token permitting this particular cartridge has not been received from the computing device 204. Rather, a token specifically permitting the cartridge 220, which is not installed within the printing device 202, has been received.

However, printing from the newly installed cartridge is still not permitted even if the printing device 202 has verified that the cartridge is the cartridge 220. Rather, if the remaining supply of the previously installed cartridge 208 had not reached the second threshold (512), then printing using the cartridge 220 is still prohibited (510). Both receipt of the token permitting usage of the cartridge 220 and the remaining supply of the previously installed cartridge 208 having reached the second threshold are conditions that have to be satisfied before the device 202 can use the cartridge 220.

Upon successful verification that the installed cartridge is the cartridge 220 (508), and if remaining print supply of the previously installed cartridge 208 had reached the second threshold, then the printing device 202 can print using the cartridge 220. Therefore, the method 500 proceeds back to FIG. 3 (514). When FIG. 3 is repeated, the method 300 is performed with respect to the cartridge 220 as the currently installed cartridge of the printing device 202.

FIGS. 4 and 5 have been described as to an implementation in which the token that has to be received before the printing device 202 can print using the replacement cartridge is specific to that cartridge. In another implementation, however, the token is not specific to a particular replacement cartridge, as noted above. In this case, so long as the printing device 202 has received a token, then the device 202 will print from any newly installed replacement cartridge if the remaining print material supply of the previously installed cartridge had reached the second threshold.

Figure 6:
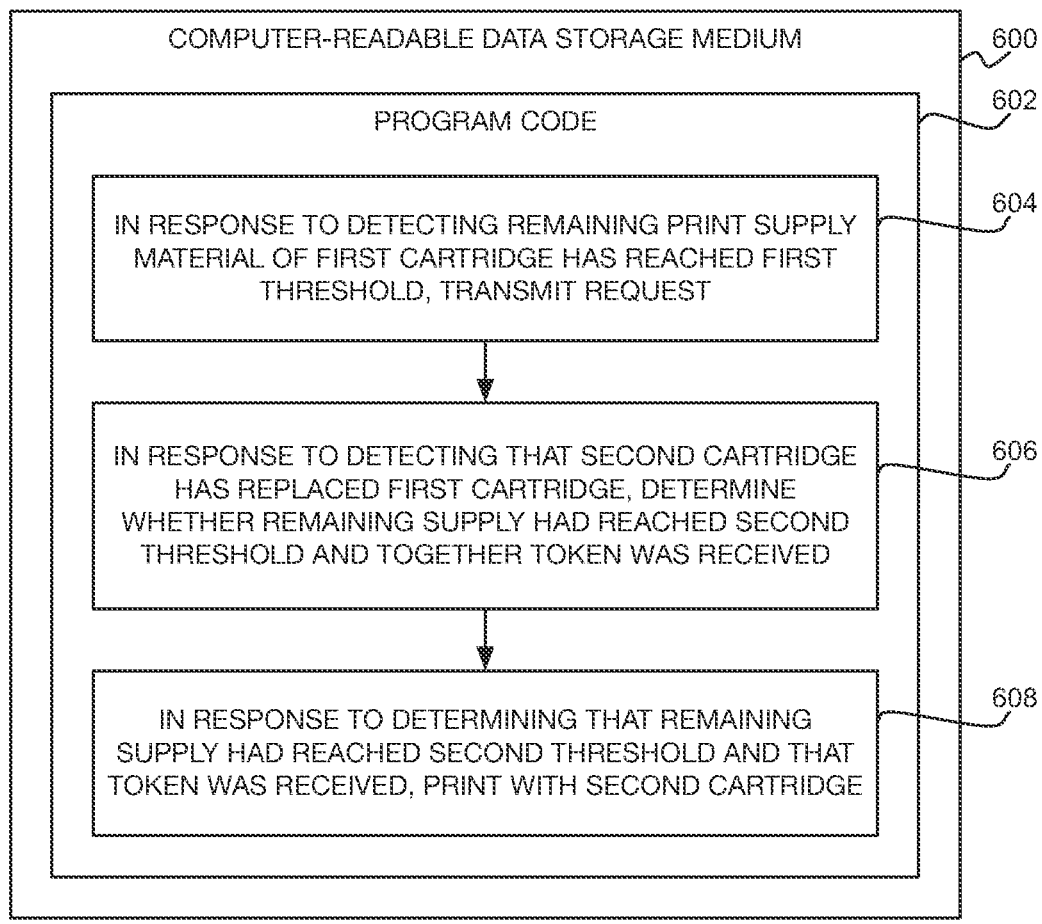
FIG. 6 is a diagram of an example non-transitory computer-readable data storage medium.

FIG. 6 shows an example non-transitory computer-readable data storage medium 600. The computer-readable data storage medium 600 stores program code 602 executable by a printing device to perform processing. The processing includes, in response to detecting that a remaining supply of print material of a first cartridge has reached a first threshold, transmitting a request (604). The processing includes, in response to detecting that a second cartridge has replaced the first cartridge, determining whether the remaining supply had reached a second threshold and whether a token permitting usage of the second cartridge was received responsive to the request (606). The processing includes, in response to determining that the remaining supply had reached the second threshold and that the token was received, printing with print material from the second cartridge (608).

FIG. 7 shows an example method 700. The method 700 includes receiving, by a computing device, a request from a printing device indicating that a remaining supply of print material of a first cartridge has reached a first threshold (702). The method 700 includes responsively transmitting, by the computing device, a token to the printing device, the token permitting usage of a second cartridge upon the remaining supply of print material of the first print cartridge reaching a second threshold (704).

FIG. 8 shows an example printing device 202. The printing device 202 can be a standalone printer or an AIO device. The printing device 202 includes print hardware 802 to print with print material from a cartridge. The print hardware 802 can include the hardware parts by which the printing device 202 deposits print material and thus prints a print job using the print material. For example, the print hardware 802 in the case of a laser-printing device may include the photoconductive drum or other surface, discharge laser or other optical source, fuser, and so on, whereas in the case of an inkjet-printing device may include an inkjet printhead.

The printing device 202 includes hardware logic 804. The hardware logic 804 may be implemented as a processor and a non-transitory computer-readable data storage medium storing program code. For example, the processor may be a general-purpose processor that executes program code stored on a memory. As another example, the processor and the computer-readable data storage medium may be implemented as an application-specific integrated circuit (ASIC) that has been encoded with the program code. The hardware logic 804 transmits a request responsive to a remaining supply of the print material of the cartridge reaching a first threshold (806), after responsively receiving a token permitting usage of a different cartridge, print with print material from the different cartridge responsive to the remaining supply having reached a second threshold (808).

Techniques have been described herein can reduce if not eliminate premature print material cartridge replacement. A printing device cannot use a replacement cartridge until the remaining supply of print material of the current cartridge has dropped below a (second) threshold and until a token permitting cartridge replacement has been received responsive to the remaining print material supply dropping below a different (first) threshold. As such, print material wastage that otherwise results from premature replacement is correspondingly reduced.

We claim:

1. A non-transitory computer-readable data storage medium storing program code executable by a printing device to perform processing comprising:
   in response to detecting that a remaining supply of print material of a first cartridge has reached a first threshold, transmitting a request;
   in response to detecting that a second cartridge has replaced the first cartridge, determining whether the remaining supply had reached a second threshold and whether a token permitting usage of the second cartridge was received responsive to the request; and in response to determining that the remaining supply had reached the second threshold and that the token was received, printing with print material from the second cartridge.

2. The non-transitory computer-readable data storage medium of claim 1, wherein the second threshold is lower than the first threshold.

3. The non-transitory computer-readable data storage medium of claim 1, wherein the request is transmitted to a computing device that initiates receipt of the second cartridge at the printing device responsive to receiving the request, and the processing further comprises:

receiving the token from the computing device upon the computing device having initiated the receipt of the second cartridge at the printing device.

4. The non-transitory computer-readable data storage medium of claim 1, wherein the token is specific to the second cartridge.

5. The non-transitory computer-readable data storage medium of claim 4, wherein the token encodes an identifier of the second cartridge, wherein the processing further comprises:

in response to detecting that the second cartridge has replaced the first cartridge, determining an identifier of the second cartridge;

verifying that the identifier of the second cartridge matches the identifier encoded within the received token, wherein printing with the print material from the second cartridge is permitted responsive to verifying that the remaining supply of the print material of the first cartridge had reached the second threshold and that the identifier of the second cartridge matches the identifier encoded within the received token.

6. The non-transitory computer-readable data storage medium of claim 1, wherein the request is a first request, and the processing further comprises:

receiving an updated first threshold responsive to transmitting the first request, in lieu of receiving the token;

in response to detecting that the remaining supply of print material has reached the updated first threshold, transmitting a second request; and in response to detecting that the second cartridge has replaced the first cartridge, determining whether the remaining supply had reached the second threshold and whether the token permitting the usage of the second cartridge was received responsive to the second request.

7. The non-transitory computer-readable data storage medium of claim 1, wherein the processing further comprises:

receiving an updated second threshold responsive to transmitting the request, in addition to receiving the token; and in response to detecting that the second cartridge has replaced the first cartridge, determining whether the remaining supply had reached the updated second threshold and whether the token permitting the usage of the second cartridge was received responsive to the request.

8. The non-transitory computer-readable data storage medium of claim 1, wherein the processing further comprises:

in response to determining that the remaining supply had not reached the second threshold, that the token was not received, or that the remaining supply had not reached the second threshold and the token was not received, prohibiting printing with the print material from the second cartridge.

9. A method comprising:

receiving, by a computing device, a request from a printing device indicating that a remaining supply of print material of a first cartridge has reached a first threshold; and responsively transmitting, by the computing device, a token to the printing device, the token permitting usage of a second cartridge upon the remaining supply of print material of the first print cartridge reaching a second threshold.

10. The method of claim 9, further comprising:

in response to receiving the request, initiating, by the computing device, receipt of the second cartridge at the printing device.

11. The method of claim 9, further comprising:

in response to receiving the request, specifying, by the computing device, the second cartridge to determine an identifier of the second cartridge; and generating, by the computing device, the token, including encoding the identifier of the second cartridge within the token.

12. The method of claim 9, wherein the request is a first request, and the method further comprises:

in response to receiving the first request, determining, by the computing device, whether the first threshold has been supplanted by an updated first threshold;

in response to determining that the first threshold has been supplanted by the updated first threshold, transmitting, by the computing device, the updated first threshold to the printing device in lieu of the token;

receiving, by the computing device, a second request from the printing device indicating that the remaining supply of print material of the first cartridge has reached than the updated first threshold; and in response to receiving the request, transmitting, by the computing device, the token to the printing device.

13. The method of claim 9, further comprising:

transmitting, by the computing device, an updated second threshold to the printing device in addition to the token, the token permitting usage of the second cartridge upon the remaining supply of the first print cartridge reaching the updated second threshold.

14. The method of claim 9, wherein the computing device periodically transmits an updated first threshold, an updated second threshold, or the updated first threshold and the updated second threshold, to the printing device prior to receiving the request.

15. A printing device comprising:

print hardware to print with print material from a cartridge; and hardware logic to:

transmit a request responsive to a remaining supply of the print material of the cartridge reaching a first threshold; and after responsively receiving a token permitting usage of a different cartridge, print with print material from the different cartridge responsive to the remaining supply having reached a second threshold.

* * * * *